Figure 1:
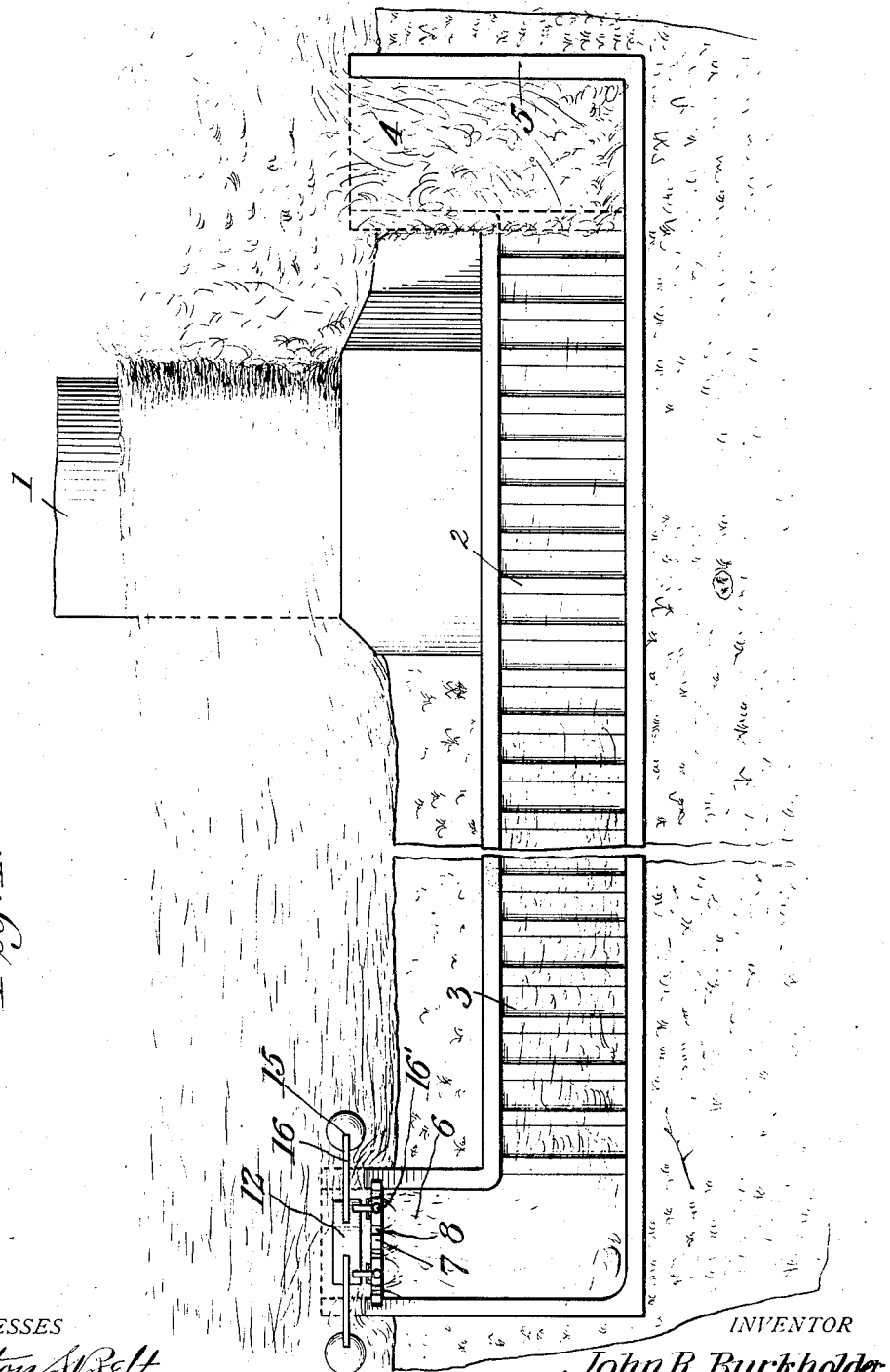

J. R. BURKHOLDER.
FISHWAY.
APPLICATION FILED MAR. 29, 1912.

1,046,964.

Patented Dec. 10, 1912.

2 SHEETS—SHEET 1.

WITNESSES

INVENTOR
John R. Burkholder

J. R. BURKHOLDER.
FISHWAY.
APPLICATION FILED MAR. 29, 1912.
1,046,964.
Patented Dec. 10, 1912.
2 SHEETS—SHEET 2.
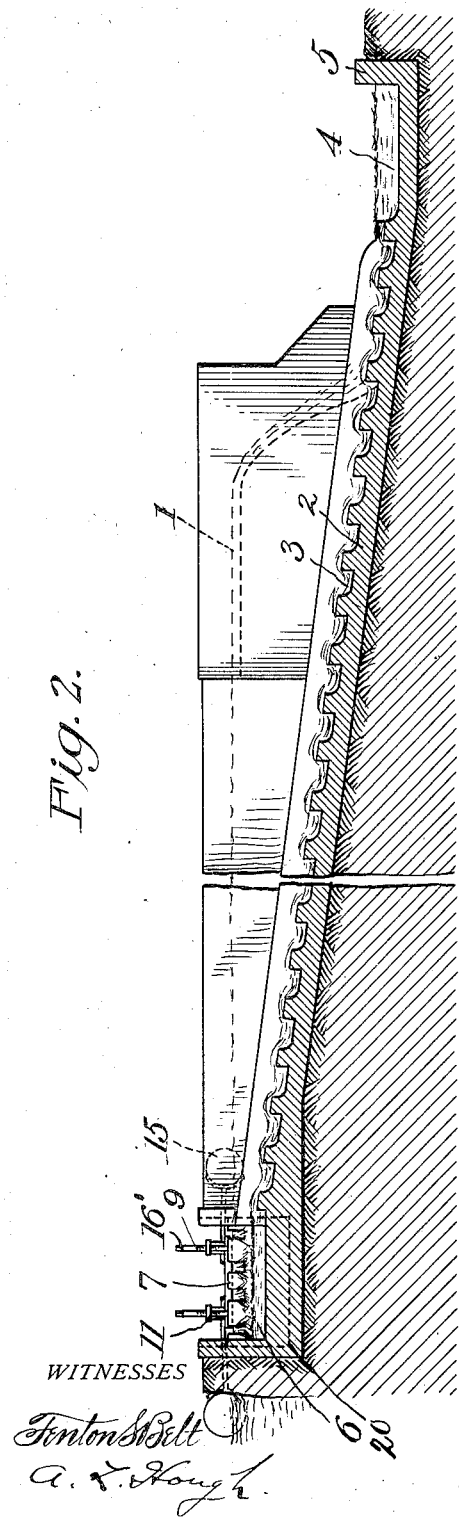
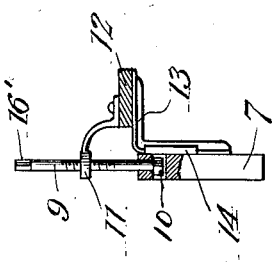
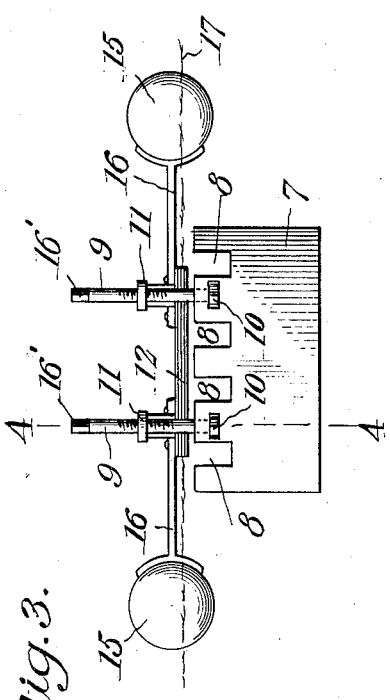
WITNESSES
INVENTOR
John R. Burkholder
Attorney

UNITED STATES PATENT OFFICE.

JOHN R. BURKHOLDER, OF LANCASTER, PENNSYLVANIA.

FISHWAY.

1,046,964.  Specification of Letters Patent.  Patented Dec. 10, 1912.

Application filed March 29, 1912. Serial No. 687,219.

*To all whom it may concern:*

Be it known that I, JOHN R. BURKHOLDER, a citizen of the United States, residing at Lancaster, in the county of Lancaster and State of Pennsylvania, have invented certain new and useful Improvements in Fishways; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fish ways and adapted to allow fish to pass from a lower level to a higher one about a water fall.

The invention comprises various details of construction and combinations and arrangements of parts which will be hereinafter fully described, shown in the accompanying drawing and then specifically defined in the appended claims.

I illustrate my invention in the accompanying drawings, in which:—

Figure 1 is a top plan view of my apparatus applied to a water way. Fig. 2 is a vertical sectional view through the way, parts being shown in elevation. Fig. 3 is an enlarged detail in elevation of an adjustable float-operated gate, and Fig. 4 is a sectional view on line 4—4 of Fig. 3.

Reference now being had to the details of the drawings by numeral, 1 designates a dam over which water falls and 2 is a water way communicating between the lower level below the dam and the level of the water above the dam. Said way, as shown in Fig. 2 of the drawings, is at an inclination and provided with a series of riffles 3 spaced apart and its lower portion has a laterally extending exit end 4 through which water passing down over the riffles commingles with the water below the dam. A flange 5 is formed along one edge of the laterally extending exit end and adapted to deflect the water in its proper course, as shown in Fig. 1 of the drawings.

The upper portion of the way extends laterally forming an inlet passage 6 which is controlled by the gate 7, a detail of which is illustrated in Fig. 3 of the drawings. Said gate is provided with a series of recesses 8 upon its upper edge and is held in adjusted positions by means of the threaded bolts 9, each of which has a head 10 which are swiveled in openings in the gate, the threaded portions of the bolts passing through threaded apertures in the bracket arms 11 which are fastened to a board 12. The gate is adapted to be held between guides 20 in the opposite walls at the entrance to the way, the water being caused to flow either over the top or through the recesses 6. Angled bracket members 13 are fastened to the under surface of said board and are guided between the flanged cleats 14 which are fastened to the face of the gate. Floats, designated by numeral 15, which in the present instance are shown as spherical-shaped, have bars 16 fastened thereto and which in turn are secured to the board 12. The upper end 16 of each bolt is squared in order to allow a wrench to be applied thereto for the purpose of turning the bolts in one direction or the other for the purpose of adjusting the gate to be held at different elevations relative to the surface of the water.

The operation of my invention will be readily understood and is as follows:—The parts being adjusted as shown, the floats will hold the gate in different positions. In the event of it being desired to hold the gate at a higher elevation than shown in Fig. 3 of the drawings, the operator by turning the bolts may cause the upper edge of the gate to be elevated to a plane above the surface of the water, thus allowing all of the water which enters the inclined way to pass through the recesses 8. In the adjustment shown in Fig. 3, the upper edge of the gate being below the surface of the water, which latter is designated by numeral 17, the water will flow over the top of the gate as the surface of the water rises and lowers, the floats causing the gate to rise and lower accordingly.

By the provision of the apparatus shown, it will be noted that a convenient means is afforded whereby fish may pass up the riffled way and through the recesses in the gates or over the top thereof in the event of the gate being lowered below the surface of the water.

What I claim to be new is:—

1. A fish way comprising an inclined riffled chute adapted to communicate at its ends with a stream of water at different inclinations, and a float-actuated gate controlling the entrance to the way and provided with recesses in the upper edge thereof, as set forth.

2. A fish way comprising an inclined riffled chute adapted to communicate at its ends with a stream of water at different inclinations, a vertically adjustable gate having recesses in the upper edge, bolts having swiveled connection with the gate, a float, bracket arms fixed thereto and having threaded openings for the reception of the threaded bolts, as set forth.

3. A fish way comprising an inclined riffled chute adapted to communicate at its ends with a stream of water at different inclinations, a vertically adjustable gate having recesses in the upper edge, bolts having swiveled connection with the gate, a board, bracket arms fixed thereto and having threaded openings for the reception of threaded bolts, arms fixed to said board, and floats secured to said arms, as set forth.

In testimony whereof I hereunto affix my signature in the presence of two witnesses.

JOHN R. BURKHOLDER.

Witnesses:
PAUL R. BYERLY,
HARRY L. HERR.